April 3, 1962   A. R. VAN WYNGARDEN   3,028,038
SERVING DEVICE
Filed Oct. 7, 1959
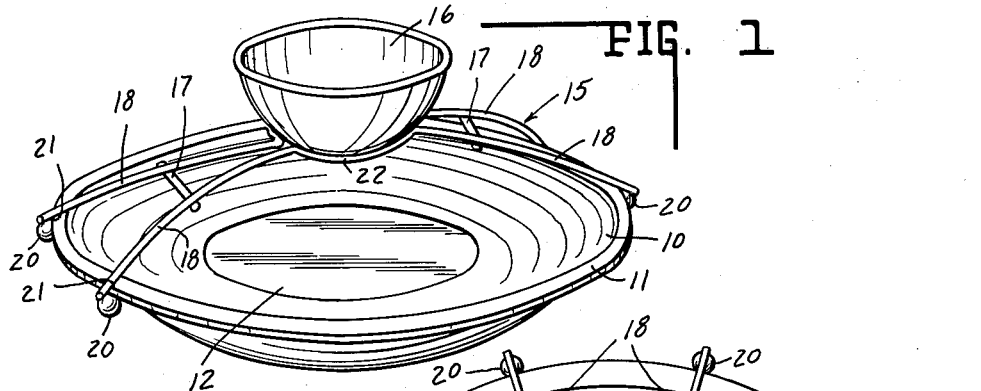
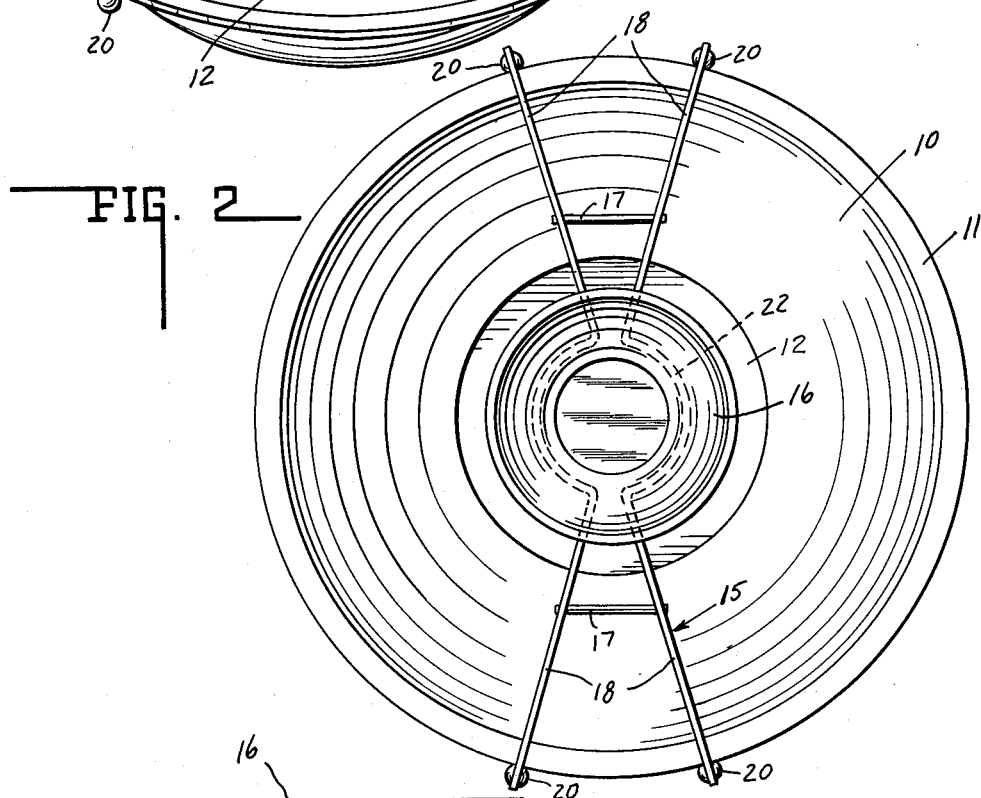
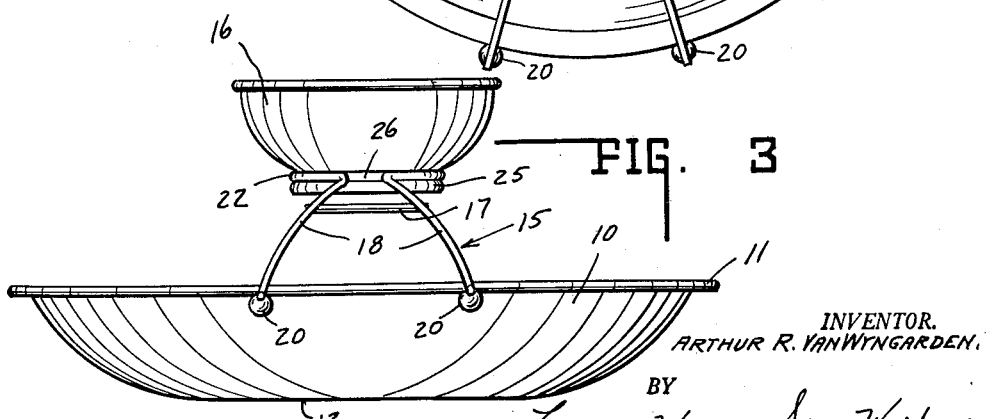
INVENTOR.
ARTHUR R. VAN WYNGARDEN.
BY
Lockwood, Woodard, Smith & Weikart.
ATTORNEYS.

United States Patent Office 3,028,038
Patented Apr. 3, 1962

3,028,038
SERVING DEVICE
Arthur R. Van Wyngarden, 6045 Rosslyn Ave.,
Indianapolis, Ind.
Filed Oct. 7, 1959, Ser. No. 845,030
3 Claims. (Cl. 220—23.83)

The present invention relates to a serving device and more particularly to a serving device incorporating a dish and a smaller bowl located in a convenient spaced relationship to the dish.

It is an object of the present invention to provide a novel and improved serving device.

A further object of the present invention is to provide a novel and improved serving device including a dish and a bowl for serving associated foods, such as potato chips and cheese dip.

Still another object of this invention is to provide a serving device incorporating a dish and a bowl which may be removably secured in a fixed and conveniently spaced relationship with respect to one another for serving associated foods.

Still further objects and advantages of the present invention will become apparent as the description proceeds.

In accordance with the present invention, there is provided a serving device which includes a dish and a resilient arched element which is formed with inwardly facing recesses at either end. The element is so formed that it may be mounted on the dish with the circumference of the dish within the recesses, the element being so constructed that it is under resilient deformation when mounted on the dish. There is also provided a cup having a peripheral groove. The element has a central opening in which the cup may be resiliently received for mounting the cup over the dish.

The full nature of the invention will be understood from the accompanying drawings and the following description and claims.

FIG. 1 is a perspective view of the serving device embodying the present invention.

FIG. 2 is a top plan view of the device of FIG. 1.

FIG. 3 is a side elevation of the device of FIG. 1.

Referring now to the drawings, this invention comprises a dish 10 having a peripheral flange 11 extending radially outwardly of the circumference of the dish. The dish 10 may be used for containing and serving potato chips or similar foods. The dish has a flat bottom portion 12 whereby the dish may rest securely without rocking upon a flat surface.

An arched element, indicated generally by the numeral 15, is provided for securely supporting a cup or bowl 16 which may be used for containing and serving cheese dip or similar foods. The arched element 15 is formed of elongated rods 18—18 and cross rods 17—17 which make possible easy viewing and access to the contents of the dish 10 because of the fact that the rods occupy very little space. Secured to the concave lower side and at each end of each rod 18 is a ball 20 which forms, with the particular rod to which it is secured, an inwardly facing recess 21. The rods 18 are generally parallel but flare outwardly at their ends. The rods are so constructed that they may be resiliently deformed for mounting the arched element upon the dish 10. When the element is so mounted, as illustrated in the drawing, the circumferential flange 11 of the dish is received within the recesses 21 and the arched element is securely mounted upon the dish because of the fact that the element is under resilient deformation. It should be understood that the cross rods 17 are fixed to the rods 18 securing the rods 18 in a spaced relationship.

The rods 18 are curved and configured at their centers so as to form a circle 22 for reception of the bowl 16. The bowl has at its base a radially extending flange 25 which defines an annular groove 26 adjacent the base. The diameter of the base is only a sufficient amount greater than the diameter of the groove 26 that the rods 18 may be resiliently deformed at the circle 22 for reception of the bowl 16 as illustrated in the drawings. When the bowl is received within the circle 22 with the rods 18 in the groove 26, the arched element 15 is under resilient deformation whereby the cup or bowl 16 is securely and removably mounted upon the arched element 15.

From the above description, it will be obvious that the present invention provides a novel and improved serving device, the dish and the bowl of which are arranged in a conveniently spaced relationship. It will be further obvious from the above description that the present invention provides a serving device incorporating a dish and a bowl which are removably but securely attached to one another. Thus the dish and the bowl may be used separately if desired and when used together, will not be susceptible to accidental spilling of the foods contained therein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A serving device comprising a dish, a pair of generally parallel arched rods, said rods flaring apart at their ends and curved at their centers to form a circle, a pair of cross rods one located on each side of the circle attaching said arched rods together, a cup having at its base a radially extending flange defining an annular groove adjacent the base, balls attached to each end of each rod on the concave side of the arch and defining with said rods inwardly opening recesses, said rods resiliently received on said dish with the circumference of said dish within said recesses, said cup being resiliently held by said rods, said circle being within said groove whereby said cup is securely but removably mounted on said rods and said rods are securely but removably mounted on said dish.

2. A serving device which comprises a dish, a pair of generally parallel arched rods, said rods flaring apart at their ends and curved at their centers to form a circle, a pair of cross rods one located on each side of the circle attaching said arched rods together, a cup having at its base a radially extending flange defining an annular groove adjacent the base, balls attached to each end of each rod on the concave side of the arch and defining with said rods inwardly opening recesses, said rods being of resilient material and so formed that they may be resiliently deformed for mounting on said dish with the circumference of said dish within said recesses, said cup being so formed that it may be forced into said circle by resilient deformation of said rods for mounting said cup upon said rods with said circle within said groove.

3. A serving device comprising a dish, a resilient element having two pairs of legs, each of said pairs of legs projecting oppositely of one another, the legs of each pair diverging outwardly of one another, each of said legs formed with an inwardly facing recess at its distal end, said element resiliently received on said dish with the circumference of said dish in the recesses of said legs, a cup having a peripheral groove, said cup having a smaller cross sectional size at said groove than on either side thereof, said element having a central opening within which said cup is received for mounting said cup over said dish, said element being formed for engaging said cup at said groove and so formed that said element is under resilient deformation when received in said groove whereby said cup is securely mounted on said element and said element is securely mounted on said dish.

References Cited in the file of this patent
UNITED STATES PATENTS

| | | |
|---|---|---|
| 1,987,896 | Ericsson | Jan. 15, 1935 |
| 2,413,535 | Weidler | Dec. 31, 1946 |
| 2,906,427 | Buechler | Sept. 29, 1959 |
| 2,926,817 | Spiers | Mar. 1, 1960 |